United States Patent
Lin et al.

(10) Patent No.: US 10,880,021 B2
(45) Date of Patent: Dec. 29, 2020

(54) WIRELESS COMMUNICATION DEVICE AND OPERATION METHOD OF THE SAME

(71) Applicant: Realtek Semiconductor Corporation, Hsinchu (TW)

(72) Inventors: Chih-Pao Lin, Zhubei (TW); Chih-Hung Tsai, Kaohsiung (TW); Chih-Yuan Chou, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 32 days.

(21) Appl. No.: 16/259,242

(22) Filed: Jan. 28, 2019

(65) Prior Publication Data

US 2019/0238240 A1    Aug. 1, 2019

(30) Foreign Application Priority Data

Jan. 29, 2018 (TW) .............................. 107103120 A

(51) Int. Cl.
*H04W 4/00* (2018.01)
*H04B 17/17* (2015.01)
(Continued)

(52) U.S. Cl.
CPC ......... *H04B 17/17* (2015.01); *H04B 17/0085* (2013.01); *H04B 17/101* (2015.01);
(Continued)

(58) Field of Classification Search
CPC .................................................... H04B 17/17
See application file for complete search history.

(56) References Cited

U.S. PATENT DOCUMENTS 8,284,721 B2 * 10/2012 Chen .................. H04B 1/406
370/329
8,457,559 B2 * 6/2013 Gao .................... H04B 1/715
370/337

(Continued)

FOREIGN PATENT DOCUMENTS

CN    103501213 A  *  1/2014
TW    201203966 A     1/2012
TW    I601388 B       10/2017

*Primary Examiner* — Guang W Li
(74) *Attorney, Agent, or Firm* — Locke Lord LLP; Tim Tingkang Xia, Esq.

(57) ABSTRACT

A wireless communication device that includes an antenna module, a first communication circuit and a second communication circuit is provided. The first communication circuit performs communication by using a first communication protocol and transmits a test signal via the antenna module. The second communication circuit performs communication by using a second communication protocol and receives the test signal to calculate an isolation index based on an actual received power thereof. The second communication circuit determines that the antenna module includes two antennas when the isolation index is smaller than a threshold value to operate the first and the second communication circuits under a dual-antenna operation mode. The second communication circuit determines that the antenna module includes one antenna when the isolation index is not smaller than the threshold value to operate the first and the second communication circuits under a shared-antenna operation mode.

20 Claims, 3 Drawing Sheets

(51) Int. Cl.
    *H04B 17/21*    (2015.01)
    *H04J 4/00*     (2006.01)
    *H04B 17/10*    (2015.01)
    *H04B 17/00*    (2015.01)
    *H04B 17/14*    (2015.01)

(52) U.S. Cl.
    CPC .......... *H04B 17/102* (2015.01); *H04B 17/14* (2015.01); *H04B 17/21* (2015.01); *H04J 4/00* (2013.01)

(56) References Cited

U.S. PATENT DOCUMENTS

| | | | |
|---|---|---|---|
| 8,797,927 B2* | 8/2014 | Chen | H04B 1/44 370/297 |
| 8,989,810 B2* | 3/2015 | Hsia | H04B 17/13 455/343.2 |
| 9,838,976 B1* | 12/2017 | Jorgovanovic | H04W 52/243 |
| 9,865,920 B1* | 1/2018 | Kuo | H01Q 5/321 |
| 2009/0176454 A1* | 7/2009 | Chen | H04W 16/14 455/63.1 |
| 2013/0315116 A1* | 11/2013 | Chen | H04B 1/44 370/297 |
| 2014/0320372 A1* | 10/2014 | Wu | H01Q 1/521 343/853 |
| 2015/0109932 A1* | 4/2015 | Goldhamer | H04L 47/125 370/236 |
| 2016/0242071 A1* | 8/2016 | Chen | H04W 28/18 |
| 2017/0311167 A1* | 10/2017 | Sun | H04L 5/0037 |
| 2020/0112853 A1* | 4/2020 | Jiang | H04W 16/14 |

\* cited by examiner

# WIRELESS COMMUNICATION DEVICE AND OPERATION METHOD OF THE SAME

RELATED APPLICATIONS

This application claims priority to Taiwan Application Serial Number 107103120, filed Jan. 29, 2018, which is herein incorporated by reference.

BACKGROUND

Field of Invention

The present invention relates to a wireless communication technology. More particularly, the present invention relates to a wireless communication device and an operation method of the same.

Description of Related Art

In recent years, the design of the wireless communication device tends to have communication circuits having different communication protocols, such as WiFi and Bluetooth be disposed on a same chip. The communication circuits having different communication protocols can either share a single antenna or use two different antennas for communication. However, under the conditions of having different number of antennas, separate circuit boards are designed to be used and separate firmwares are used accordingly such that the communication circuit operates according to a particular number of antenna. Not only that the cost can be higher for such implementations, but the risk of using the wrong firmware also exists.

Accordingly, what is needed is an integrated circuit and an operation method of the same to address the issues mentioned above.

SUMMARY

An aspect of the present invention is to provide a wireless communication device that includes an antenna module, a first communication circuit and a second communication circuit. The first communication circuit is configured to perform communication via the antenna module by using a first communication protocol and configured to transmit a test signal via the antenna module. The second communication circuit is configured to perform communication via the antenna module by using a second communication protocol and configured to receive the test signal for calculation of an isolation index according to an actual received power of the test signal. When the isolation index is smaller than a threshold value, the antenna module is determined to comprise two antennas such that the first communication circuit and the second communication circuit are operated in a dual-antenna operation mode. When the isolation index is not smaller than the threshold value, the antenna module is determined to comprise a single antenna such that the first communication circuit and the second communication circuit are operated in a shared-antenna operation mode.

Another aspect of the present invention is to provide a wireless communication device operation method that includes the steps outlined below. A test signal is transmitted via an antenna module by a first communication circuit that performs communication via the antenna module by using a first communication protocol. The test signal is received for calculation of an isolation index according to an actual received power of the test signal by a second communication circuit that performs communication via the antenna module by using a second communication protocol. When the isolation index is smaller than a threshold value, the antenna module is determined to include two antennas by the second communication module such that the first communication circuit and the second communication circuit are operated in a dual-antenna operation mode. When the isolation index is not smaller than the threshold value, the antenna module is determined to include a single antenna by the second communication module such that the first communication circuit and the second communication circuit are operated in a shared-antenna operation mode.

Yet aspect of the present invention is to provide a wireless communication circuit adapted for coupling with an antenna module that includes a first communication circuit and a second communication circuit. The first communication circuit is configured to perform communication via the antenna module by using a first communication protocol and configured to transmit a test signal via the antenna module. The second communication circuit is configured to perform communication via the antenna module by using a second communication protocol and configured to receive the test signal for calculation of an isolation index according to an actual received power of the test signal. When the isolation index is smaller than a threshold value, the antenna module is determined to comprise two antennas such that the first communication circuit and the second communication circuit are operated in a dual-antenna operation mode. When the isolation index is not smaller than the threshold value, the antenna module is determined to comprise a single antenna such that the first communication circuit and the second communication circuit are operated in a shared-antenna operation mode.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figure 1:
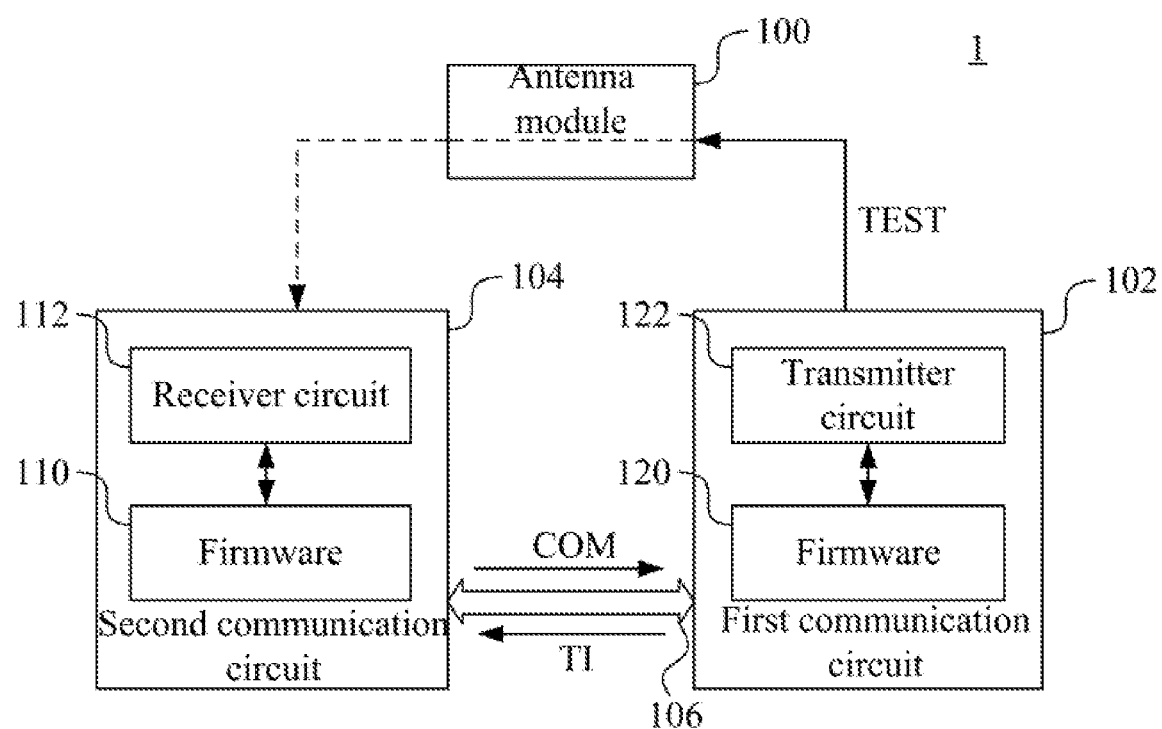
FIG. 1 is a block diagram of a wireless communication device in an embodiment of the present invention.

Reference is now made to FIG. 1. FIG. 1 is a block diagram of a wireless communication device 1 in an embodiment of the present invention. The wireless communication device 1 includes an antenna module 100, a first communication circuit 102 and a second communication circuit 104.

The antenna module 100 includes one or more than one antennas. The first communication circuit 102 is configured to perform communication via the antenna module 100 by using a first communication protocol. The second communication circuit 104 is configured to perform communication via the antenna module 100 by using a second communication protocol.

In an embodiment, the first communication circuit 102 is such as, but not limited to a Bluetooth communication module to perform communication by using Bluetooth communication protocol. The second communication circuit 104 is such as, but not limited to a WiFi communication module to perform communication by using WiFi communication protocol.

In an embodiment, the Bluetooth communication protocol is a communication technology using 2.4 GHz frequency band, and the WiFi communication protocol is a communication technology using 2.4 GHz frequency band or 5 GH frequency band. Further, the bandwidth of the WiFi communication protocol is greater than the bandwidth of the Bluetooth communication protocol.

When the number of the antenna in or attached to the antenna module 100 is unknown, the second communication circuit 104 can, based on operation of firmware 110 thereof, transmit a command signal COM via a physical transmission interface 106 to the first communication circuit 102, and the first communication circuit 102 receives the command signal COM. In an embodiment, after receiving the command signal COM, the first communication circuit 102 processes the command signal COM based on the firmware 120 thereof and controls a transmitter (TX) circuit 122 to transmit the test signal TEST via the antenna module 100.

In an embodiment, the test signal TEST is a fixed frequency signal, and the second communication circuit 104 performs power analysis on the test signal TEST.

The firmware 120 of the first communication circuit 102 further controls to transmit test information TI to the second communication circuit 104 via the physical transmission interface 106 according to the command signal COM such that the firmware 110 of the second communication circuit 104 may control to perform processing on the test information TI. In an embodiment, the test information TI includes the delivered power $P_{BT}$ of the test signal TEST.

After transmitting the command signal COM to the first communication circuit 102, the second communication circuit 104 is operated under a frequency-scanning mode. The firmware 110 controls a receiver circuit (RX) 112 to receive the test signal TEST via the antenna module 100. Moreover, the firmware 110 of the second communication circuit 104 operates for calculation of an actual received power of the test signal TEST.

In an embodiment, the receiver circuit 112 of the second communication circuit 104 may selectively include a low noise amplifier (LNA), a mixer, a filter, a programmable gain amplifier, an analog-to-digital converter or a combination thereof to accomplish the reception and the analysis of the test signal TEST.

In an embodiment, the second communication circuit 104 measures a received power $P_{BTcouple,\ PSD}$ of the test signal TEST. However, the path from the antenna module 100 to the second communication circuit 104 attenuates the power of the test signal TEST.

The attenuated power can be obtained or measured by such as, but not limited to using a microwave signal generator to generate a signal having the same frequency of the test signal TEST that has a power $P_{IN}$ and using the second communication circuit 104 for receiving the above signal having a relative value $P_{IN,\ PSD}$. The attenuated power is calculated by subtracting the power $P_{IN}$ by the relative value $P_{IN,\ PSD}$, i.e., attenuated power $P_{IN}-P_{IN,\ PSD}$. As a result, the actual received power $P_{BTcouple}$ relative to the antenna module 100 is obtained by adding the received power $P_{BTcouple,\ PSD}$ with the attenuated power $P_{IN}-P_{IN,\ PSD}$.

In the present embodiment, each of the actual received power $P_{BTcouple}$ and the receive power $P_{BTcouple,\ PSD}$ is a power spectral density (PSD).

As a result, the actual received power $P_{BTcouple}$ can be expressed by the following equation:

$$P_{BTcouple}=P_{BTcouple,\ PSD}+(P_{IN}-P_{IN,\ PSD})$$

Furthermore, the isolation index iso can be obtained by subtracting the delivered power $P_{BT}$ by the actual received power $P_{BTcouple}$:

$$Iso=P_{BT}-(P_{BTcouple,\ PSD}+(P_{IN}-P_{IN,\ PSD}))=P_{BT}-P_{IN}+P_{IN,\ PSD}-P_{BTcouple,\ PSD}$$

Figure 2A:
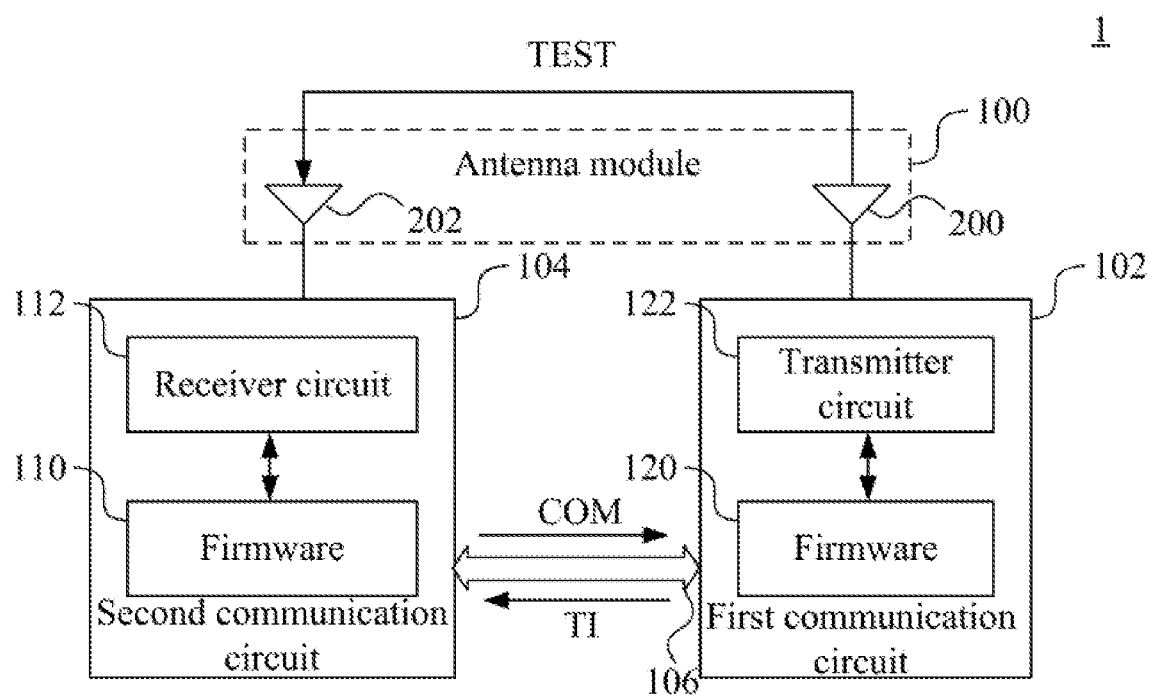
FIG. 2A and FIG. 2B are block diagrams of the wireless communication device under the conditions that the antenna module includes different number of antennas in an embodiment of the present invention.
Figure 2B:
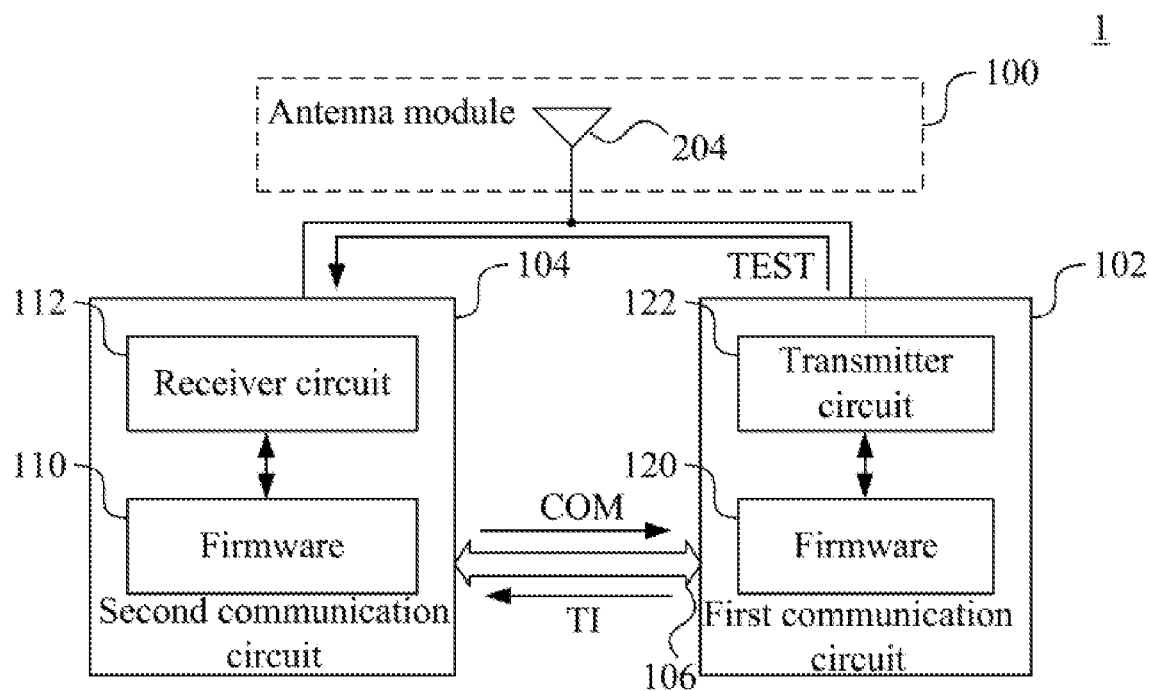

Reference is now made to FIG. 2A and FIG. 2B at the same time. FIG. 2A and FIG. 2B are block diagrams of the wireless communication device 1 under the conditions that the antenna module 100 includes different number of antennas in an embodiment of the present invention.

When the isolation index is smaller than a threshold value, the second communication circuit 104 determines that the antenna module 100 includes two antennas 200 and 202, as illustrated in FIG. 2A. In other words, when the first communication circuit 102 transmits the test signal TEST via the antenna 200, the second communication circuit 104 tends to receive more power from the test signal TEST via the antenna 202.

As a result, the first communication circuit 102 and the second communication circuit 104 are operated in a dual-antenna operation mode. The first communication circuit 102 and the second communication circuit 104 perform communication via the antennas 200 and 202 respectively. In an embodiment, the dual-antenna operation mode is a frequency-division duplex (FDD) mode such that the first communication circuit 102 and the second communication circuit 104 perform communication by using the antennas 200 and 202 respectively in different frequency bands.

When the isolation index is not smaller than the threshold value, the antenna module 100 is determined to include a single antenna 204, as illustrated in FIG. 2B. In other words, since the antenna 204 is used by the first communication circuit 102, the more of the power received by the second communication circuit 104 is via the physical path connected to the first communication circuit 102 and the less power received by the second communication circuit 104 is actual from the test signal TEST.

As a result, the first communication circuit 102 and the second communication circuit 104 are operated in a shared-antenna operation mode. The first communication circuit 102 and the second communication circuit 104 shares the antenna 204 to perform communication therevia. In an embodiment, the shared-antenna operation mode is a time-division duplex (TDD) mode such that the first communication circuit 102 and the second communication circuit 104 perform communication by using the antenna 204 in different time slots interlaced with each other.

The wireless communication device 1 of the present invention can analyze the test signal TEST transmitted by the first communication circuit 102 by using the second communication circuit 104 to obtain the isolation index therebetween to further determine the number of the antennas in the antenna module 100 such that the first communication circuit 102 and the second communication circuit 104 operate according to the number of the antennas. As a result, the wireless communication device 1 can use a circuit board designed to be adapted to both the antenna module having the dual antennas and the antenna module having the single antenna. The firmware for both the antenna module having the dual antennas and the antenna module having the single antenna can be burnt in the circuit board and is operated according to the number of the antennas. Different designs made for different number of antennas are not required. Further, addition instrument for measuring of the isolation index is not required either. No matter the cost of hardware or cost of the test procedure can be greatly reduced.

It is appreciated that the communication protocols corresponding to the first communication circuit 102 and the second communication circuit 104 described above are merely an example. In other embodiments, the first communication circuit 102 and the second communication circuit 104 can correspond to other communication protocols.

For example, both of the first communication circuit 102 and the second communication circuit 104 can correspond to WiFi communication protocol. Under such a condition, the first communication circuit 102 can selectively transmit packets to the second communication circuit 104 such that the second communication circuit 104 obtains the isolation index by analyzing the content of the packets directly.

Further, the components included in the first communication circuit 102 and the second communication circuit 104 illustrated in FIG. 1, FIG. 2A and FIG. 2B are merely an example. For example, the first communication circuit 102 may include a corresponding receiver circuit, and the second communication circuit 104 may include a corresponding transmitter circuit.

Furthermore, in the above embodiments, the description is made by using two communication circuits as an example. In other embodiments, the wireless communication device 1 may include more than two communication circuits. For example, the wireless communication device 1 may include t10 communication circuits corresponding to four different communication protocols that include such as, but not limited to WiFi, BT, LTE and GPS. The communication circuits can use the transmission and the reception of the signals among each other to detect the existence of the antennas to accomplish the detection mechanism of the number of the antennas.

Figure 3:
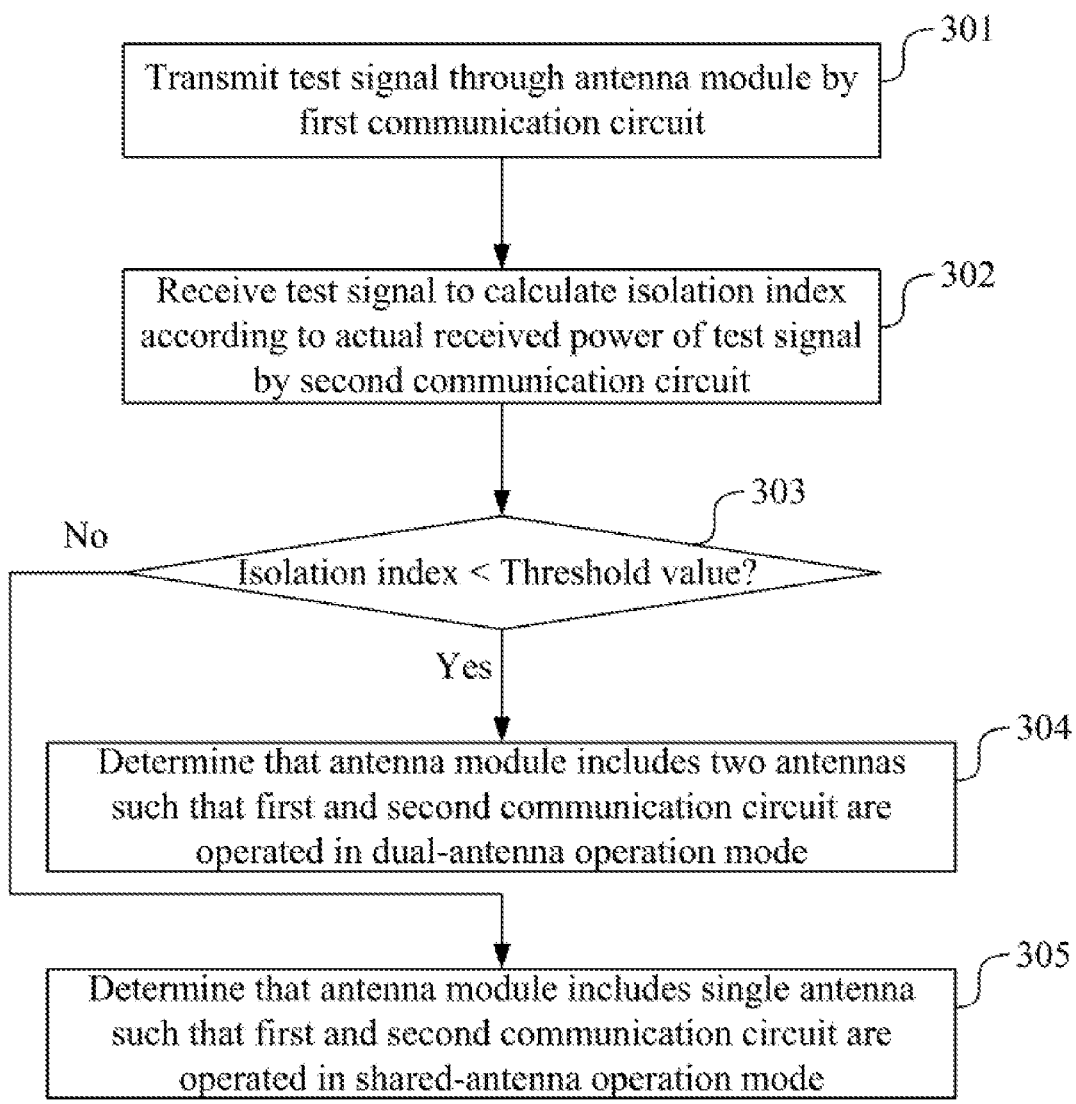
FIG. 3 is a flow chart of a wireless communication device operation method in an embodiment of the present invention.

Reference is now made to FIG. 3. FIG. 3 is a flow chart of a wireless communication device operation method 300 in an embodiment of the present invention. The wireless communication device operation method 300 can be used in the wireless communication device 1 in FIG. 1. The wireless communication device operation method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the test signal TEST is transmitted via the antenna module 100 by the first communication circuit 100 that performs communication via the antenna module 100 by using the first communication protocol.

In step 302, the test signal is received to calculate the isolation index Iso according to the actual received power $P_{BTcouple}$ of the test signal TEST by the second communication circuit 104 that performs communication via the antenna module 100 by using the second communication protocol.

In step 303, whether the isolation index Iso is smaller than the threshold value is determined.

In step 304, when the isolation index Iso is smaller than the threshold value, the antenna module 100 is determined to include two antennas by the second communication module 104 such that the first communication circuit 102 and the second communication circuit 104 are operated in the dual-antenna operation mode.

In step 305, when the isolation index Iso is not smaller than the threshold value, the antenna module 100 is determined to include a single antenna by the second communication module 104 such that the first communication circuit 102 and the second communication circuit 104 are operated in the shared-antenna operation mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless communication device comprising:
   an antenna module;
   a first communication circuit configured to perform communication via the antenna module by using a first communication protocol and configured to transmit a test signal via the antenna module; and
   a second communication circuit configured to perform communication via the antenna module by using a second communication protocol and configured to receive the test signal for calculation of an isolation index according to an actual received power of the test signal;
   wherein when the isolation index is smaller than a threshold value, the antenna module is determined to include two antennas such that the first communication circuit and the second communication circuit are operated in a dual-antenna operation mode; and
   when the isolation index is not smaller than the threshold value, the antenna module is determined to include a single antenna such that the first communication circuit and the second communication circuit are operated in a shared-antenna operation mode.

2. The wireless communication device of claim 1, wherein the dual-antenna operation mode is a frequency-division duplex (FDD) mode, and the shared-antenna operation mode is a time-division duplex (TDD) mode.

3. The wireless communication device of claim 1, wherein the actual received power is a power spectral density (PSD).

4. The wireless communication device of claim 1, wherein a bandwidth of the second communication circuit is greater than the bandwidth of the first communication circuit.

5. The wireless communication device of claim 1, wherein one of the first communication circuit and the second communication circuit is Bluetooth and the other one is WiFi.

6. The wireless communication device of claim 1, wherein the test signal is a fixed frequency signal.

7. The wireless communication device of claim 1, wherein the second communication circuit is further configured to transmit a command signal via a physical transmission interface to the first communication circuit such that the first communication circuit transmits the test signal via the antenna module according to the command signal and transmits test information to the second communication circuit via the physical transmission interface.

8. The wireless communication device of claim 7, wherein the test information comprises the delivered power of the test signal, and the second communication circuit is further configured to add a received power of the test signal to an attenuated power between the antenna module to the second communication circuit to calculate the actual received power and subtract the delivered power by the actual received power to calculate the isolation index.

9. A wireless communication device operation method comprising:
  transmitting a test signal via an antenna module by a first communication circuit that performs communication via the antenna module by using a first communication protocol;
  receiving the test signal for calculation of an isolation index according to an actual received power of the test signal by a second communication circuit that performs communication via the antenna module by using a second communication protocol;
  when the isolation index is smaller than a threshold value, determining that the antenna module comprises two antennas by the second communication module such that the first communication circuit and the second communication circuit are operated in a dual-antenna operation mode; and
  when the isolation index is not smaller than the threshold value, determining that the antenna module comprises a single antenna by the second communication module such that the first communication circuit and the second communication circuit are operated in a shared-antenna operation mode.

10. The wireless communication device operation method of claim 9, wherein the dual-antenna operation mode is a frequency-division duplex mode, and the shared-antenna operation mode is a time-division duplex mode.

11. The wireless communication device operation method of claim 9, wherein the actual received power is a power spectral density.

12. The wireless communication device operation method of claim 9, wherein a bandwidth of the second communication circuit is greater than the bandwidth of the first communication circuit.

13. The wireless communication device operation method of claim 9, wherein one of the first communication circuit and the second communication circuit is Bluetooth and the other one is WiFi.

14. The wireless communication device operation method of claim 9, wherein the test signal is a fixed frequency signal.

15. The wireless communication device operation method of claim 9, further comprising:
  transmitting a command signal via a physical transmission interface by the second communication circuit to the first communication circuit; and
  transmitting the test signal via the antenna module according to the command signal and transmitting test information to the second communication circuit via the physical transmission interface by the first communication circuit.

16. The wireless communication device operation method of claim 15, wherein the test information comprises the delivered power of the test signal, the wireless communication device operation method further comprises:
  adding a received power of the test signal to an attenuated power between the antenna module to the second communication circuit to calculate the actual received power and subtracting the delivered power by the actual received power to calculate the isolation index by the second communication circuit.

17. A wireless communication circuit adapted for coupling with an antenna module, comprising:
  a first communication circuit configured to perform communication via the antenna module by using a first communication protocol and configured to transmit a test signal via the antenna module; and
  a second communication circuit configured to perform communication via the antenna module by using a second communication protocol and configured to receive the test signal for calculation of an isolation index according to an actual received power of the test signal;
  wherein when the isolation index is smaller than a threshold value, the antenna module is determined to include two antennas such that the first communication circuit and the second communication circuit are operated in a dual-antenna operation mode; and
  when the isolation index is not smaller than the threshold value, the antenna module is determined to include a single antenna such that the first communication circuit and the second communication circuit are operated in a shared-antenna operation mode.

18. The wireless communication circuit of claim 17, wherein a bandwidth of the second communication circuit is greater than the bandwidth of the first communication circuit.

19. The wireless communication circuit of claim 17, wherein the second communication circuit is further configured to transmit a command signal via a physical transmission interface to the first communication circuit such that the first communication circuit transmits the test signal via the antenna module according to the command signal and transmits test information to the second communication circuit via the physical transmission interface.

20. The wireless communication circuit of claim 19, wherein the test information comprises the delivered power of the test signal, and the second communication circuit is further configured to add a received power of the test signal to an attenuated power between the antenna module to the second communication circuit to calculate the actual received power and subtract the delivered power by the actual received power to calculate the isolation index.

* * * * *